(12) United States Patent
Anantharaman et al.

(10) Patent No.: US 8,230,569 B2
(45) Date of Patent: Jul. 31, 2012

(54) REPAIR OF CASE FLANGE WITH BOLT HOLES

(75) Inventors: Ganesh Anantharaman, East Hartford, CT (US); Gerard Dame, East Haddam, CT (US)

(73) Assignee: United Technologies Corporation, Hartford, CT (US)

( * ) Notice: Subject to any disclaimer, the term of this patent is extended or adjusted under 35 U.S.C. 154(b) by 787 days.

(21) Appl. No.: 12/356,353

(22) Filed: Jan. 20, 2009

(65) Prior Publication Data

US 2010/0183431 A1    Jul. 22, 2010

(51) Int. Cl.
 *B23P 6/00* (2006.01)
(52) U.S. Cl. ............... 29/402.11; 29/402.01; 29/402.13
(58) Field of Classification Search .............. 29/402.01, 29/402.11, 402.13, 402.16; 219/121.14; 415/215.1
See application file for complete search history.

(56) References Cited

U.S. PATENT DOCUMENTS

| | | | |
|---|---|---|---|
| 1,322,245 A * | 11/1919 | Klassen | 29/888.011 |
| 1,989,695 A * | 2/1935 | Jensen | 29/402.11 |
| 2,120,525 A | 6/1938 | McKerihan | |
| 2,198,167 A * | 4/1940 | Harman | 29/402.11 |
| 2,998,645 A * | 9/1961 | Diperstein | 29/402.11 |
| 3,152,816 A * | 10/1964 | Smith | 285/15 |
| 3,445,914 A | 5/1969 | Altgelt | |
| 3,623,129 A | 11/1971 | Miles | |
| 4,207,630 A * | 6/1980 | Bressler | 4/252.4 |
| 4,953,777 A * | 9/1990 | Griffith et al. | 228/119 |
| 5,111,570 A | 5/1992 | Baumgarten et al. | |
| 5,201,455 A | 4/1993 | Reynolds, Jr. et al. | |
| 6,243,948 B1 | 6/2001 | Lee et al. | |
| 6,370,752 B1 | 4/2002 | Anderson et al. | |
| 6,413,650 B1 | 7/2002 | Dupree et al. | |
| 7,244,320 B2 * | 7/2007 | Malley et al. | 148/419 |

(Continued)

FOREIGN PATENT DOCUMENTS

EP    0 263 713 A1    4/1988

(Continued)

OTHER PUBLICATIONS

Extended Search Report of the European Patent Office in counterpart foreign Application No. 09250941.3, filed Mar. 30, 2009.

*Primary Examiner* — David Bryant
*Assistant Examiner* — Jacob Cigna
(74) *Attorney, Agent, or Firm* — Kinney & Lange, P.A.

(57) ABSTRACT

A method for repairing damaged bolt holes in a flange having a plurality of circumferentially spaced bolt holes therein, with each bolt hole defining a center axis and the flange defining an outer diameter edge. The method includes removing parent material of the flange in a first pattern, and metallurgically joining a replacement detail to the parent material of the flange a location where the parent material of the flange was removed in the first pattern. The first pattern is bounded by first, second, third and fourth points. The first point corresponds to the center axis of a first of the plurality of bolt holes, the second point corresponds to center axis of a second of the plurality of bolt holes, and the third and fourth points are defined at the outer diameter edge of the flange circumferentially spaced from each other.

17 Claims, 4 Drawing Sheets

U.S. PATENT DOCUMENTS

| | | | |
|---|---|---|---|
| 7,858,897 B2 * | 12/2010 | Beranger | 219/121.14 |
| 2005/0015980 A1 | 1/2005 | Kottilingam et al. | |
| 2006/0011708 A1 | 1/2006 | Bouet et al. | |
| 2007/0084906 A1 | 4/2007 | Vargas et al. | |
| 2008/0000193 A1 * | 1/2008 | Holland et al. | 52/741.4 |
| 2008/0099446 A1 | 5/2008 | Belanger | |

FOREIGN PATENT DOCUMENTS

| | | |
|---|---|---|
| EP | 1 602 442 A1 | 7/2005 |
| EP | 1 775 061 A1 | 4/2007 |
| EP | 1775061 A1 * | 4/2007 |
| EP | 1 916 051 A1 | 4/2008 |

* cited by examiner

REPAIR OF CASE FLANGE WITH BOLT HOLES

BACKGROUND

This disclosure relates to repairs to flanges having openings therein.

Engine components, such as case structures for gas turbine engines, can become worn or damaged during use. For example, cracks, hole elongations, etc. can develop in case flanges and necessitate gas turbine engine case replacement or repair. Generally, replacement of worn and damaged parts can be costly, while repairs to existing parts can be more cost-effective. However, known methods for repairing cracks and other wear or damage to case flanges tend to induce distortions and new cracks, leading to a need for substantial rework that can make case flange repairs impractical or impossible. For example, it is known to blend (i.e., grind) cracks and perform a weld repair at bolt holes. However, heat treatment that must be performed following welding produces a high probability (approximately 90%) of crack re-growth at adjacent bolt holes. It is desired to provide an effective and efficient repair for flanges with bolt holes.

SUMMARY

A method for repairing damaged bolt holes in a flange having a plurality of circumferentially spaced bolt holes therein, with each bolt hole defining a center axis and the flange defining an outer diameter edge. The method includes removing parent material of the flange in a first pattern, and metallurgically joining a replacement detail to the parent material of the flange a location where the parent material of the flange was removed in the first pattern. The first pattern is bounded by first, second, third and fourth points. The first point corresponds to the center axis of a first of the plurality of bolt holes, the second point corresponds to center axis of a second of the plurality of bolt holes, and the third and fourth points are defined at the outer diameter edge of the flange circumferentially spaced from each other.

DETAILED DESCRIPTION

Figure 1:
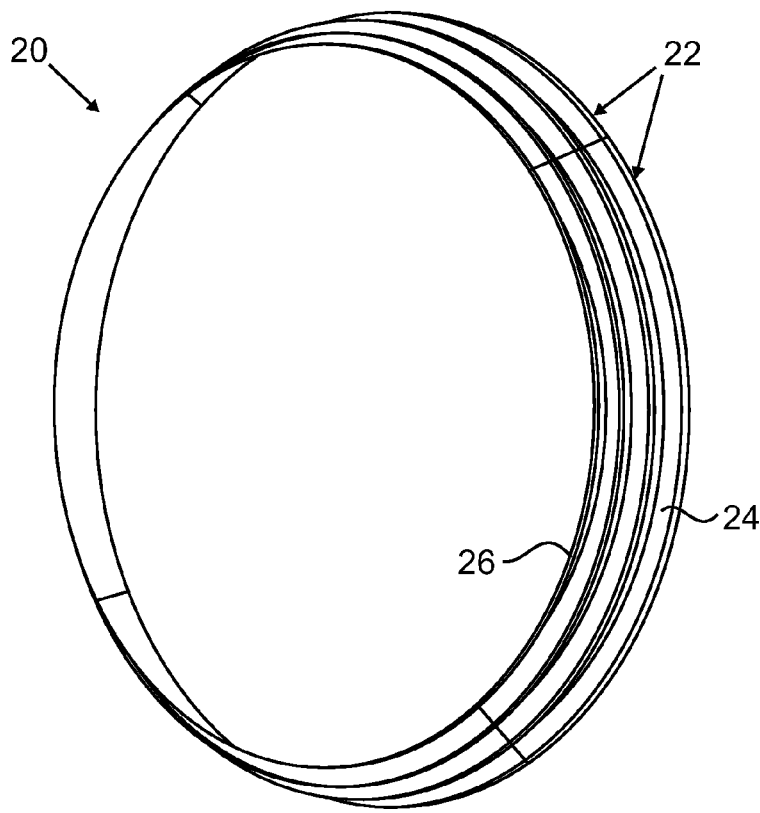
FIG. 1 is a perspective view of a case assembly for a gas turbine engine.

FIG. 1 is a perspective view of a case assembly 20 for a gas turbine engine (not shown). The case assembly 20 is formed from a plurality of case segments 22 assembled together in a generally annular shape, each including a wall 24 and a flange 26. Each case segment 22 can be made of a metallic material.

Figure 2:
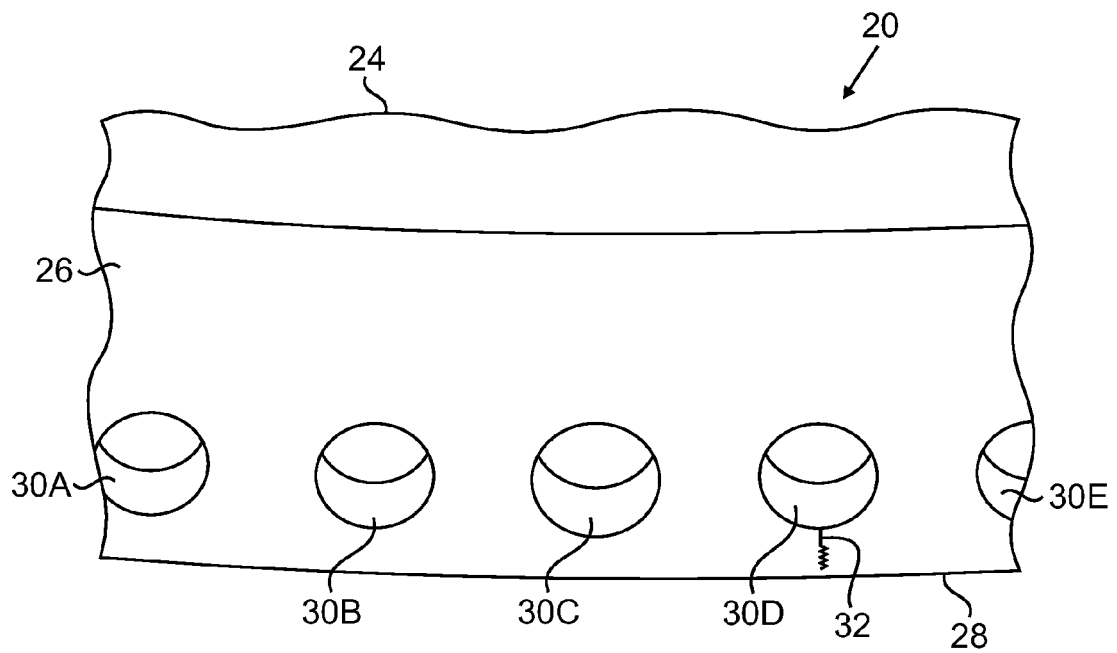
FIG. 2 is a perspective view of a portion of the case assembly prior to repair.

FIG. 2 is a perspective view of a portion of the case assembly 20 prior to repair. The flange 26 has an outer edge 28 (e.g., an outer diameter edge) and a plurality of circumferentially spaced bolt holes 30 defined therein (bolt holes 30A-30E are shown, and are collectively referred to by reference number 30). The bolt holes 30 allow the flange 26 to be mechanically connected to other components in the engine. During use, the flange 26 and the bolt holes 30 can become worn or damaged. For example, as illustrated in FIG. 2, the bolt hole 30C is undesirably enlarged and an outbound crack 32 extends from the bolt hole 30D toward the outer edge 28. These forms of wear and damage are merely exemplary, and it should be understood that the method (see FIG. 7) applies to other types of flange wear and damage as well.

Figure 3:
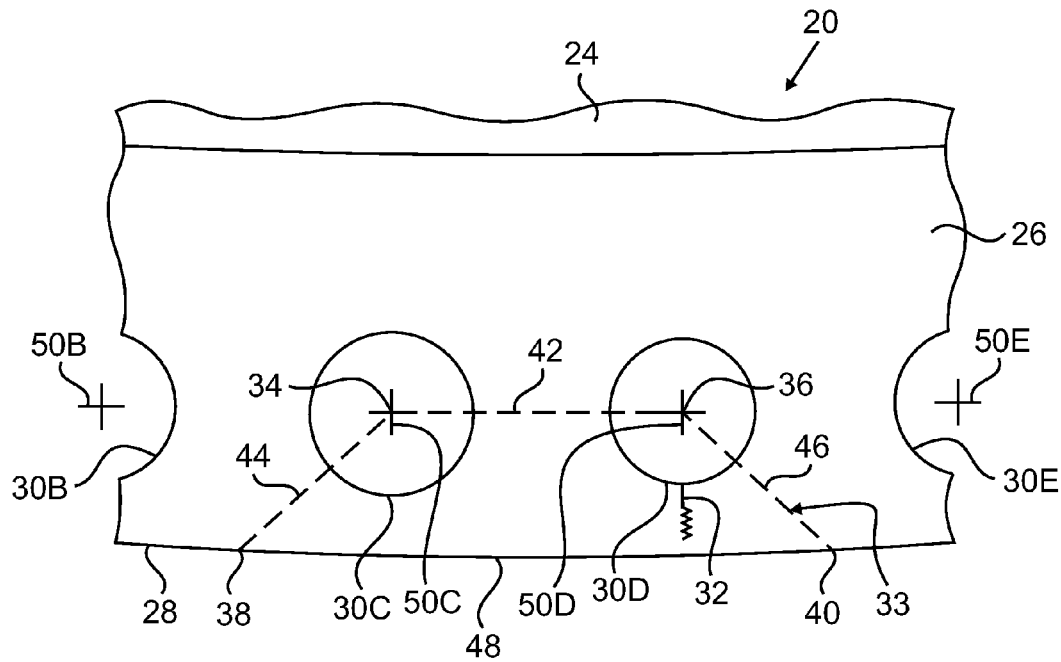
FIGS. 3 and 4 are front views of a portion of the case assembly during repair.
Figure 4:
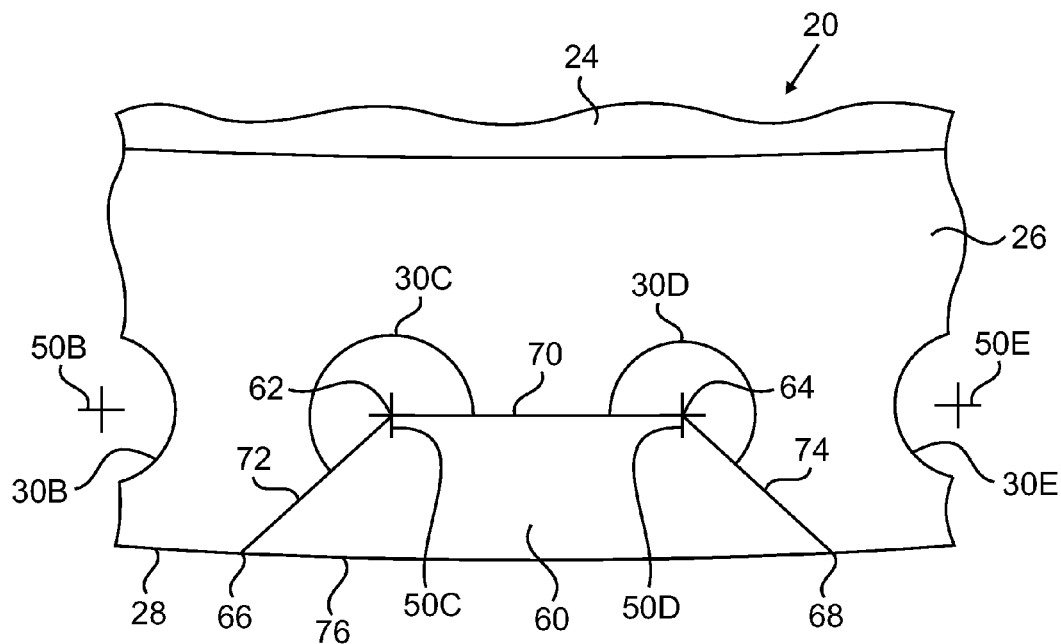

FIGS. 3 and 4 are front views of a portion of the case assembly 20 during a repair. As shown in FIG. 3, a pattern 33 is defined relative to the flange 26. In the illustrated embodiment the pattern 33 is substantially trapezoidal in shape, and is bounded by first, second, third and fourth corner points 34, 36, 38 and 40, respectively. A first perimeter portion 42 is defined between the first and second corner points 34 and 36. A second perimeter portion 44 is defined between the first and third corner points 34 and 38, and a third perimeter portion 46 is defined between the second and fourth corner points 36 and 40. A fourth perimeter portion 48 is defined between the third and fourth corner points 38 and 40. Obtuse included angles are defined at both the first and second corner points 34 and 36. Furthermore, the first and second corner points 34 and 36 are substantially aligned with the center axes 50C and 50D of the bolt holes 30C and 30D, respectively. Acute included angles are defined at both the third and fourth corner points 38 and 40, which are both defined along the outer edge 28 of the flange 26, and can be substantially radially aligned with midpoints between circumferentially adjacent bolt holes 30. In other words, the third corner point 38 can be located approximately midway between the center axes 50B and 50C of the circumferentially adjacent bolt holes 30B and 30C, respectively, and the fourth corner point 40 can be located approximately midway between the center axes 50D and 50E of the bolt holes 30D and 30E, respectively. The first, second and third perimeter portions 42, 44 and 46 of the pattern 33 can each be substantially linear, and the fourth perimeter portion 48 can be arcuate to align with the outer edge 28 of the flange 26.

The pattern 33 defines a region in which parent material of the flange 26 is removed. The pattern 33 can encompass worn or damaged regions of the flange 26, such as the crack 32 and elongated portions of the bolt hole 30C, in order to redress those defects. It has been found that a perimeter of the pattern 33 tends to be located in relatively low stress areas, which helps provide for more robust repairs. Parent material of the flange 26 can be removed by known machining techniques.

A replacement detail 60 is created (e.g., through forming, stamping, machining, or any other suitable process or processes) to replace the parent material of the flange 26 removed within the pattern 33. The replacement detail 60 can be made of the parent material of the flange 26, or alternatively a different material from the parent material. The replacement detail 60 can be a generally trapezoidal shaped wedge, and more particularly, can have a shape substantially the same as that of the pattern 33 from which parent material was removed from the flange 26. As shown in FIG. 4, the replacement detail 60 is defined by first, second, third and fourth corner projections 62, 64, 66 and 68, respectively. A first perimeter portion 70 is defined between the first and second corner projections 62 and 64. A second perimeter portion 72 is defined between the first and third corner projections 62 and 66, and a third perimeter portion 74 is defined between the second and fourth corner projections 64 and 68. A fourth perimeter portion 76 is defined between the third and fourth corner projections 66 and 68. Obtuse included angles are defined at both the first and second corners 62 and 64. Acute included angles are defined at both the third and fourth corner projections 66 and 68. In alternative embodiments, the replacement detail 60 can be slightly larger than the pattern 33, for instance, with the fourth perimeter portion 76 extending radially beyond the location of the fourth perimeter portion 48 of the pattern 33.

The replacement detail 60 is positioned against the flange 26, at the location where parent material was removed within the pattern 33. The first and second corner projections 62 and 64, respectively, can substantially align with the center axes 50C and 50D of the bolt holes 30C and 30D, respectively. The replacement detail 60 is then metallurgically joined to the parent material of the flange 26. The replacement detail 60 can be welded (e.g., using electron beam welding) along portions of each of the first, second and third perimeter portions 70, 72 and 74 to form metallurgical joints.

Figure 5:
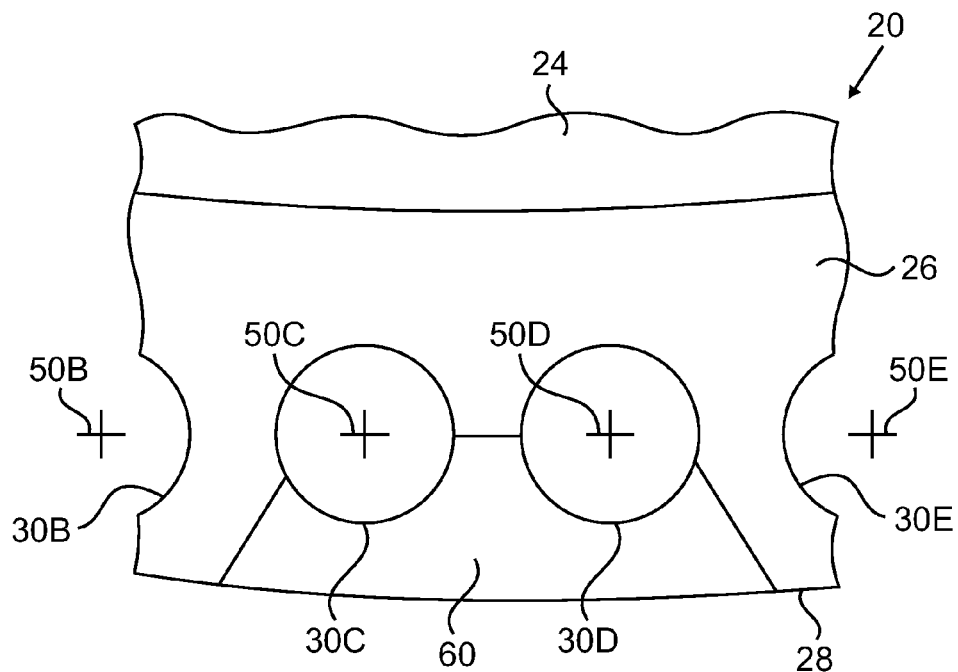
FIG. 5 is a front view of a portion of the case assembly after repair.

After the replacement detail 60 has been welded to the parent material of the flange 26, machining is performed to remove portions of the replacement detail 60 to bring the case assembly 20 to serviceable limits (e.g., blueprint specifications). In particular, the shape of the bolt holes 30C and 30D and the outer edge 28 can be redefined through machining, and blending can be performed on welded areas. FIG. 5 is a front view of the portion of the case assembly 20 after repair. Additional steps not specifically discussed can also be performed during repair of the case assembly 20, such as heat treatment.

Figure 6:
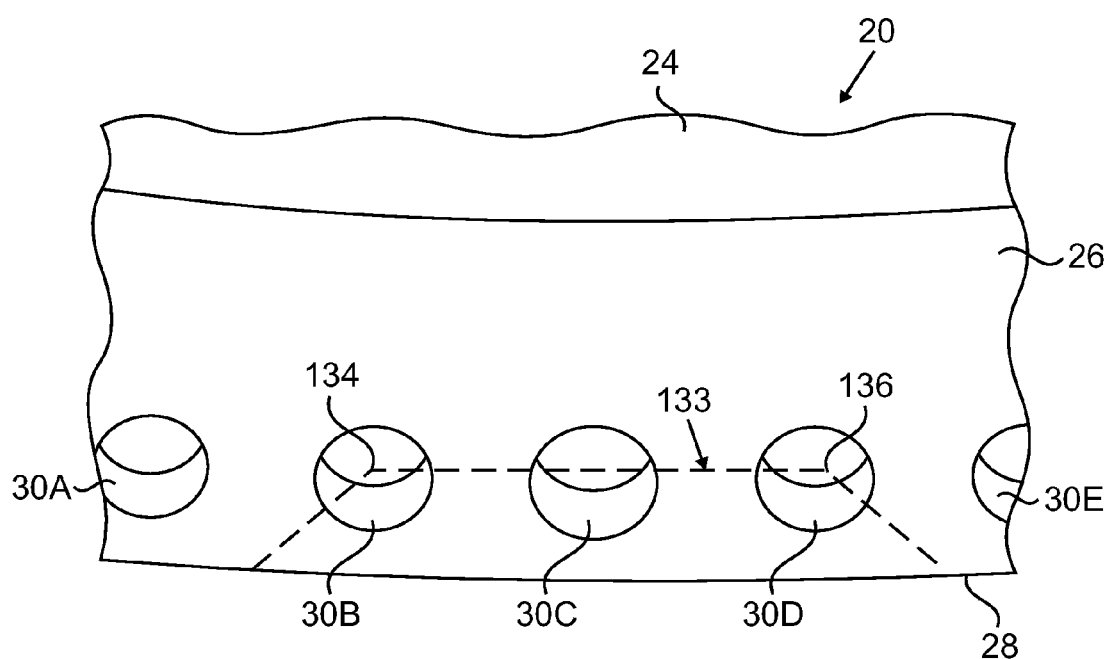
FIG. 6 is a front view of a portion of the case assembly during an alternative repair process.

FIG. 6 is a front view of a portion of the case assembly 20 during an alternative repair process. This alternative repair process is generally similar to that described above, except that a different pattern 133 is defined for parent material removal. The pattern 133 is substantially trapezoidal in shape and extends across more than two of the bolt holes 30 in the flange 26. In the illustrated embodiment, the pattern 133 is partially bounded by corner points 134 and 136 substantially aligned with center axes (not labeled in FIG. 6) of the bolt holes 30B and 30D, respectively, and a perimeter of the pattern 133 passes through the bolt hole 30C. In other words, the pattern 133 spans three circumferentially adjacent bolt holes 30B-30D. In further embodiments, removal patterns can span even greater numbers of bolt holes.

Figure 7:
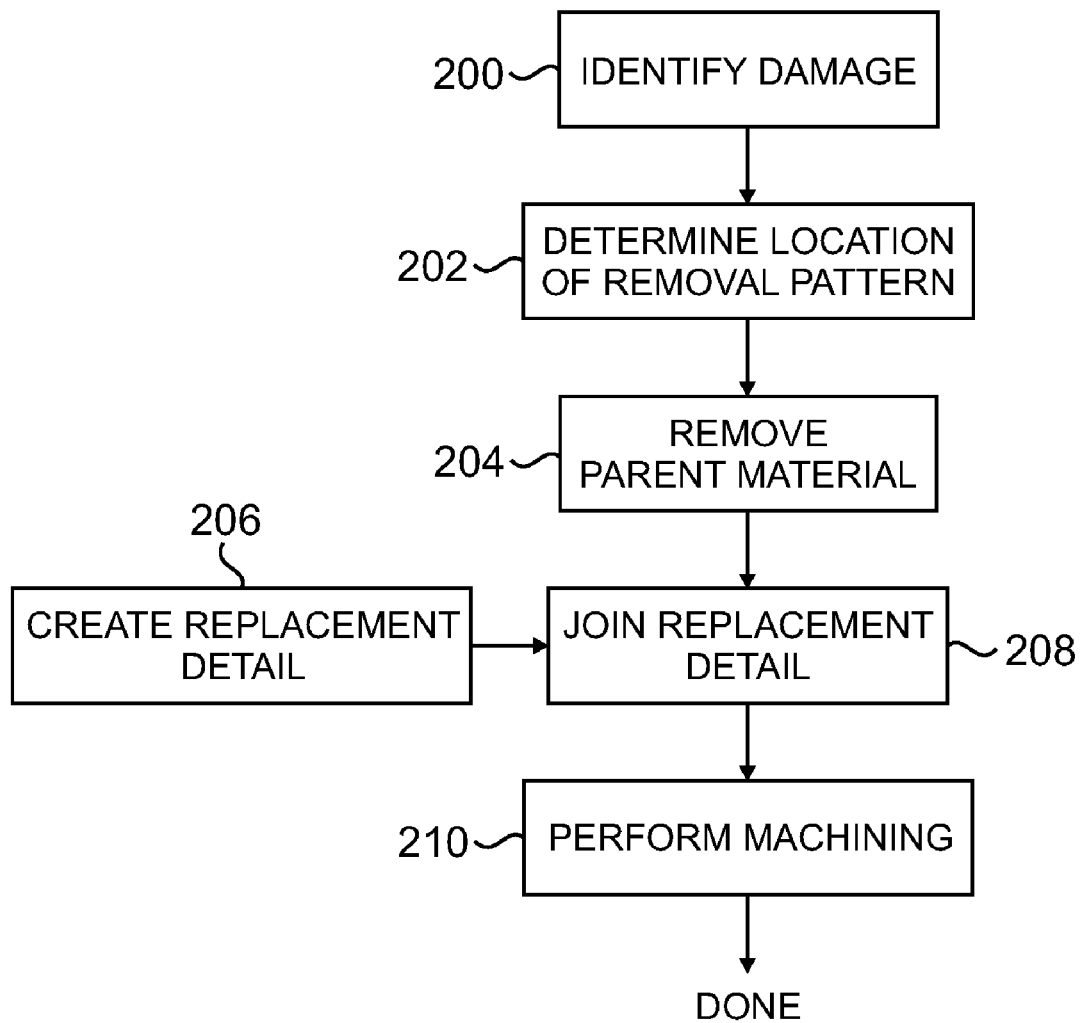
FIG. 7 is a flow chart of a repair process.

FIG. 7 is a flow chart of a repair process. After a component is removed from an engine, a first step is to identify damage (or wear) in need of repair (step 200). Next, a location of a parent material removal pattern is determined on a flange of the component undergoing repair (step 202), and parent material of the flange is removed within the removal pattern (step 204). A replacement detail having a shape similar to that of the removal pattern is created or otherwise provided (step 206), and the replacement detail is metallurgically joined to the parent material of the flange at the location where parent material was removed within the removal pattern (step 208). As noted above, in one embodiment the removal pattern and replacement detail can be substantially trapezoidal in shape, and the step of metallurgical joining can involve welding. Lastly, machining can be performed to remove portions of the replacement detail to bring the component undergoing repair to serviceable limits (e.g., blueprint specifications) and the component reinstalled in an engine for use. Additional steps not specifically discussed, such as heat treatment, can also be performed during repair.

Although exemplary embodiments have been described, workers skilled in the art will recognize that changes may be made in form and detail without departing from the spirit and scope of the invention. For example, the repair can be performed in conjunction with other repair processes not specifically mentioned.

The invention claimed is:

1. A method for repairing damaged bolt holes in a flange having a plurality of circumferentially spaced bolt holes therein, each bolt hole defining a center axis, and the flange defining an outer diameter edge, the method comprising:

removing parent material of the flange, wherein the parent material is removed in a first pattern bounded by first, second, third and fourth points, wherein the first point corresponds to the center axis of a first of the plurality of bolt holes, wherein the second point corresponds to center axis of a second of the plurality of bolt holes, and wherein the third and fourth points are defined at the outer diameter edge of the flange circumferentially spaced from each other; and metallurgically joining a replacement detail to the parent material of the flange a location where the parent material of the flange was removed in the first pattern.

2. The method of claim 1, wherein the first pattern is substantially trapezoidally shaped.

3. The method of claim 2, wherein the trapezoidally shaped first pattern defines obtuse included angles at both the first point and the second point.

4. The method of claim 1, wherein the replacement detail is metallurgically joined by electron beam welding.

5. The method of claim 1, wherein the first and second bolt holes are located directly adjacent one another.

6. The method of claim 1, wherein a third of the plurality of bolt holes is positioned in between the first and second bolt holes.

7. The method of claim 1 and further comprising:

machining the replacement detail to restore the flange and bolt holes to operational limits.

8. The method of claim 1, wherein a perimeter portion of the first pattern is substantially aligned with a midpoint between adjacent bolt holes.

9. The method of claim 1, wherein a third of the plurality of bolts holes is located adjacent to the first bolt hole opposite the second bolt hole, wherein a fourth of the plurality of bolts holes is located adjacent to the second bolt hole opposite the first bolt hole, wherein the third point is located at or near a midpoint between the center axes of the first and third bolt holes, and wherein the fourth point is located at or near a midpoint between the center axes of the second and fourth bolt holes.

10. A method for repairing flanges having a plurality of circumferentially spaced bolt holes, the method comprising:

removing a portion of a parent material of the flange to remove a damaged portion thereof; and welding a substantially trapezoidally shaped replacement detail to the parent material of the flange where the portion of the parent material was removed, wherein the replacement detail comprises a first corner substantially aligned with a center axis of a first of the plurality of bolt holes and a second corner substantially aligned with a center axis of a second of the plurality of bolt holes, and wherein the replacement detail further comprises a third corner radially positioned at or beyond an outer diameter of the flange and a fourth corner radially positioned at or beyond an outer diameter of the flange and circumferentially spaced from the third corner.

11. The method of claim 10, wherein the portion of the parent material removed is substantially trapezoidally shaped.

12. The method of claim 10, wherein the replacement detail defines obtuse included angles adjacent to the center axes of the first and second bolt holes.

13. The method of claim 10, wherein the replacement detail is joined using electron beam welding.

14. The method of claim 10, wherein the first and second bolt holes are located directly adjacent one another.

15. The method of claim 10, wherein a third of the plurality of bolt holes is positioned in between the first and second bolt holes.

16. The method of claim 10 and further comprising:
 machining the replacement detail following welding to restore the flange and bolt holes to operational limits.

17. The method of claim 10, wherein a boundary of the portion of the parent material removed from the flange is substantially aligned with a midpoint between adjacent bolt holes.

* * * * *